(12) United States Patent
Pytel et al.

(10) Patent No.: US 9,026,523 B2
(45) Date of Patent: May 5, 2015

(54) EFFICIENT SELECTION OF QUERIES MATCHING A RECORD USING A CACHE

(71) Applicant: International Business Machines Corporation, Armonk, NY (US)

(72) Inventors: Alexei L. Pytel, Rochester, MN (US); Kevin J. Kathmann, Rochester, MN (US); Steven J. Simonson, Rochester, MN (US); Thomas J. Wasik, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/104,106

(22) Filed: Dec. 12, 2013

(65) Prior Publication Data

US 2014/0101164 A1   Apr. 10, 2014

Related U.S. Application Data

(63) Continuation of application No. 13/632,595, filed on Oct. 1, 2012.

(51) Int. Cl.
G06F 17/30 (2006.01)

(52) U.S. Cl.
CPC ................. G06F 17/30424 (2013.01)

(58) Field of Classification Search
USPC ............... 707/2, 3, 713; 709/204–206
See application file for complete search history.

(56) References Cited

U.S. PATENT DOCUMENTS

| | | | |
|---|---|---|---|
| 6,185,557 B1 | 2/2001 | Liu | |
| 7,499,910 B2 | 3/2009 | Schneider et al. | |
| 7,669,147 B1 | 2/2010 | Molander | |
| 2003/0009443 A1 | 1/2003 | Yatviskiy | |
| 2004/0133537 A1 | 7/2004 | Uceda-Sosa | |
| 2006/0106832 A1 | 5/2006 | Ben-Dyke et al. | |
| 2007/0059685 A1 | 3/2007 | Kohne | |
| 2007/0100803 A1 | 5/2007 | Cava | |
| 2008/0086452 A1 | 4/2008 | Jonas et al. | |
| 2009/0164947 A1 | 6/2009 | Taylor | |
| 2009/0182766 A1 | 7/2009 | Draese | |
| 2010/0049693 A1 | 2/2010 | Cao et al. | |

(Continued)

OTHER PUBLICATIONS

Lee et al, "Dynamic Access Path Determination for Tuple Selection", Technical Disclosure, Feb. 15, 2005, pp. 1-4.
Moore et al "Cached Sufficient Statistics for Efficient Machine Learning with Large Datasets", The Robotics Institute, Jul. 1997; pp. 1-23.

(Continued)

Primary Examiner — Etienne Leroux
(74) Attorney, Agent, or Firm — Cantor Colburn LLP; William A. Kinnaman, Jr.

(57) ABSTRACT

A method is provided for constructing a cache for storing results of previously evaluated queries in a binary tree based on a cache key. The cache is searched, by a processing device, for a node representing a set of previously evaluated queries that match a given record using an instance of the cache key. In response to finding a representative node that matches the instance of the cache key, the method performs processing associated with the set of previously evaluated queries. In response to finding no representative nodes, the method creates a new node using the instance of the cache key. The method of the invention then updates the cache by classifying the compatibility of newly registered queries with the cache key and evaluating whether compatible newly registered queries match the record.

20 Claims, 5 Drawing Sheets

(56) References Cited

U.S. PATENT DOCUMENTS

| | | |
|---|---|---|
| 2012/0166419 A1 | 6/2012 | Enoki et al. |
| 2012/0203740 A1 | 8/2012 | Ben-Dyke et al. |
| 2014/0095508 A1 | 4/2014 | Pytel et al. |
| 2014/0095531 A1 | 4/2014 | Pytel et al. |

OTHER PUBLICATIONS

Chakrabarti et al "Method and System for Matching DOM Trees to Search Logs for Accurate Webpage Clustering", Technical Disclosure, Defensive Publication, Apr. 30, 2010, pp. 1-6.

Gururaj S., "Method and System for Caching Metadata Associated with Complex Pathing Analysis Queries", Technical Disclosure, Defensive Publication, Oct. 14, 2010, pp. 1-7.

EFFICIENT SELECTION OF QUERIES MATCHING A RECORD USING A CACHE

CROSS-REFERENCE TO RELATED APPLICATION

This application is a continuation of U.S. patent application Ser. No. 13/632,595, filed Oct. 1, 2012, the disclosure of which is incorporated by reference herein in its entirety.

BACKGROUND

The present invention relates to the selection of queries, and more specifically, to the efficient selection of a subset of queries that match a given record from a set of registered queries using a cache of results of prior query selections.

Contemporary query engines are typically given a set of records comprising a set of data fields and one query represented by a logical expression over those fields, and solve a problem of finding all records in a set of records that match the given query. Contemporary query engines, however, have not addressed the opposite problem wherein given one record and a set of registered queries, the query engine finds all queries in the set of queries that match this record. The number of registered queries that have to be evaluated to determine all matches for a given record may become large enough that the cost becomes prohibitive due to the computational burden increasing as the allowable range and complexity of the queries increase. This cost manifests as hardware cost and system performance reductions.

SUMMARY

According to an embodiment, a computer program including a computer readable storage medium having computer readable program code stored thereon that, when executed, perform a method comprising constructing a cache for storing results of previously evaluated queries in a binary tree based on a cache key. The cache is searched, with a processing device, for a node representing a set of previously evaluated queries that match a given record using an instance of the cache key. In response to finding a representative node that matches the instance of the cache key, the computer program product performs processing associated with the set of previously evaluated queries. In response to finding no representative nodes, the computer program product creates a new node using the instance of the cache key. The computer program product of the invention then updates the cache by classifying the compatibility of newly registered queries with the cache key and evaluating whether compatible newly registered queries match the record.

According to another embodiment, a computer system including a processor, a system memory, and a bus is configured to perform a method including constructing a cache for storing results of previously evaluated queries in a binary tree based on a cache key. The cache is searched for a node representing a set of previously evaluated queries that match a given record using an instance of the cache key. In response to finding a representative node that matches the instance of the cache key, the method performs processing associated with the set of previously evaluated queries. In response to finding no representative nodes, the method creates a new node using the instance of the cache key. The method of the invention then updates the cache by classifying the compatibility of newly registered queries with the cache key and evaluating whether compatible newly registered queries match the record.

According to another embodiment a computer-implemented method is provided for constructing a cache for storing results of previously evaluated queries in a binary tree based on a cache key. The cache is searched, by a processing device, for a node representing a set of previously evaluated queries that match a given record using an instance of the cache key. In response to finding a representative node that matches the instance of the cache key, the method performs processing associated with the set of previously evaluated queries. In response to finding no representative nodes, the method creates a new node using the instance of the cache key. The method of the invention then updates the cache by classifying the compatibility of newly registered queries with the cache key and evaluating whether compatible newly registered queries match the record.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein improve the performance of query selection by using a cache structure for storing the results of prior query selections in a form of a binary tree based on a cache key. This binary tree provides fast access to the results of the prior query selections while the cache structure avoids deep analysis of the registered queries. Embodiments also maintain and update the validity of the cache structure by classifying the compatibility of newly registered queries with the cache key and evaluating whether compatible newly registered queries match the given record.

Figure 1:
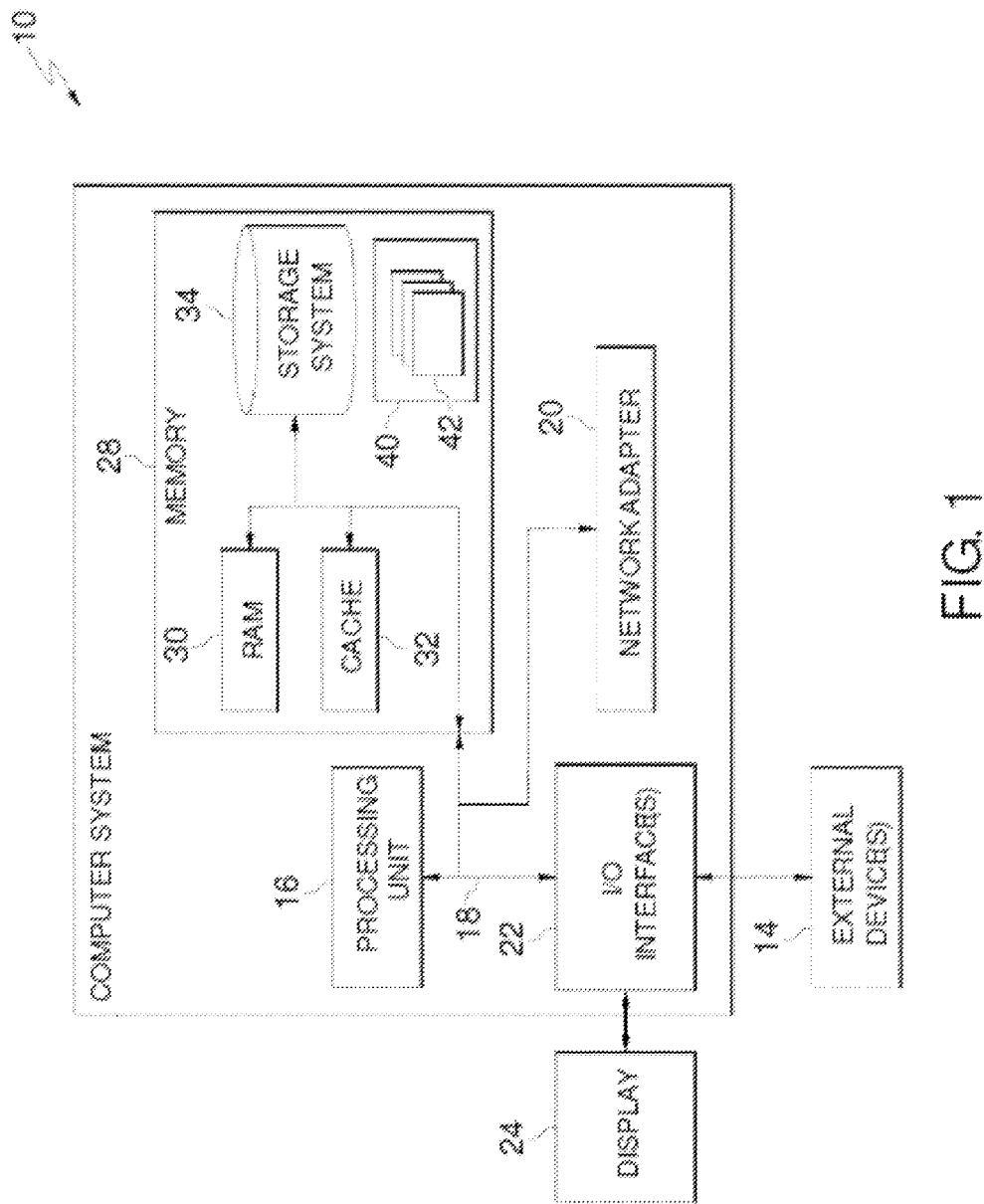
FIG. 1 depicts a block diagram of a computer system according to an embodiment.

Referring now to FIG. 1, a block diagram of a computer system 10 suitable for implementing a method for efficient selection of a subset of queries according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 10 is shown in the form of a general-purpose computing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
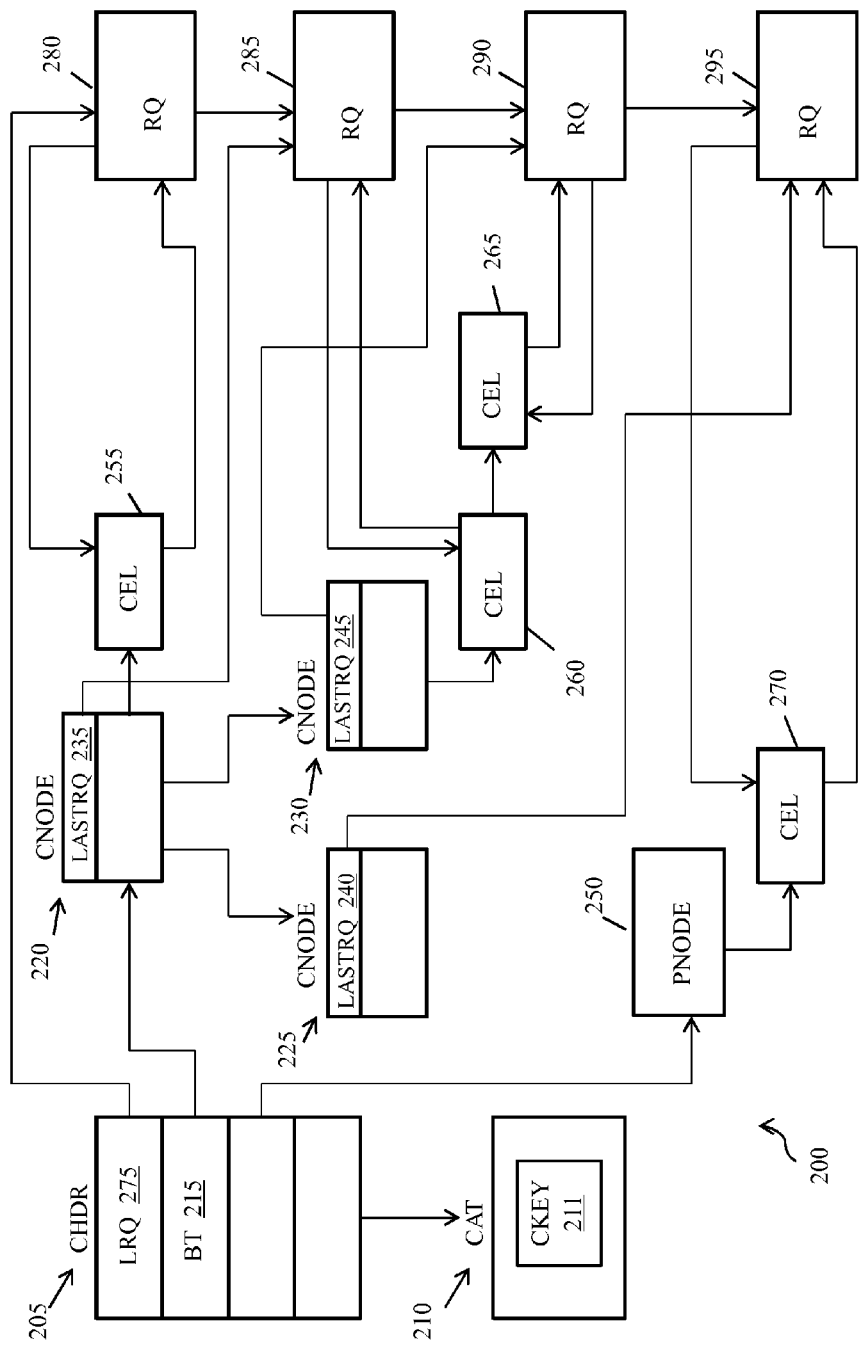
FIG. 2 depicts a block diagram of a query selection cache according to an embodiment.

With reference now to FIG. 2, a block diagram of a query selection cache 200 for efficiently finding all registered queries that match a given record, in accordance with an exemplary embodiment is shown. A record represents a unit of data comprising a set of data fields that is presented to the query searching method of embodiments of the invention to find all matching registered queries stored in the query selection cache 200.

The query selection cache (QSC) 200 comprises a cache control header (CHDR) 205, a cache attribute table (CAT) 210, a binary tree (BT) 215 including cache nodes (CNODEs) 220, 225, 230, wherein each CNODE includes a pointer to a last scanned registered query (LASTRQ) 235, 240, 245, a placeholder cache node (PNODE) 250, cache list elements (CELs) 255, 260, 265, 270, and a list of registered queries (LRQ) 275, which lists registered queries (RQs) 280, 285, 290, 295.

All registered queries 280, 285, 290, 295 are arranged in an ordered list of registered queries (LRQ) 275, which is stored in the query selection cache 200 according to an embodiment of the invention. The list of registered queries 275 is in chronological order based on the arrival order of the registered queries 280, 285, 290, 295. New registered queries are added to the end of the list of registered queries 275.

Registered queries 280, 285, 290, 295 each contain a logical expression used to select records. The logical expression uses data fields of the record to form an expression that is evaluated to be true or false. If the logical expression evaluates to true, the respective registered query selects this record.

The cache control header 205 is an anchor point for all other data elements that control the cache. The cache attribute table 210 describes cache attributes and, among other functions, the cache attribute table 210 points to an expression evaluator (EVAL) and query processing exit (QPEX).

The expression evaluator is a software algorithm that is invoked to test a match between a given record and a registered query. An input to the expression evaluator is one record and one logical expression. Expression evaluator applies the logical expression to the data fields of the record and returns a conclusion whether the logical expression matches the record (true) or not (false).

Each registered query also has a query processing exit associated with it. When a registered query is found to match the record presented to the algorithm, the query processing exit is invoked to perform the requested processing.

An aspect of the cache attribute table 210 is a specification of a cache key (CKEY) 211. The cache key 211 is a combination of one or more data fields found in the record. Results of the prior query selection requests are saved in the query selection cache 200 using a binary tree 215. This binary tree 215 is based on the cache key 211.

It is possible to use all the data fields of a record as the cache key 211. As a result, every record will eventually be represented in the binary tree 215 of the query selection cache 200. This will cause all queries to be compatible with the cache key 211, which will result in good performance when selecting the queries since the binary tree 215 will provide efficient access to the data. However, the size of the selection query cache 200 and associated costs to manage the selection query cache 200, such as registering and de-registering the queries, may become prohibitive.

On the other hand, if too few fields are added to the cache key 211, many or most of the queries will be incompatible with the cache key 211. Such queries will have to be re-evaluated for every selection request. The selection query cache 200 will become smaller, but a performance benefit will not be realized.

Accordingly, the practical choice of data fields from the record to be included in the cache key 211 is a tradeoff between better selectivity, wherein most data fields are added to the cache key, and a smaller cache size wherein few data fields are added to the cache key 211.

An embodiment includes cache nodes (CNODEs) 220, 225, 230 that represent a set of registered queries that match a particular instance of the cache key 211. In other words, the cache nodes 220, 225, 230 match records with a particular combination of values of the data fields selected for a cache key 211. Cache nodes 220, 225, 230 use the cache key 211 as an access key and are arranged into a binary tree 215 based on the value of the cache key 211.

An embodiment includes a cache node having a pointer to the last scanned query (LASTRQ) 235, 240, 245. The last scanned query is the last registered query that has been checked for a match for that cache node. Every cache node potentially has its own last scanned query.

The last scanned queries (LASTRQ) 235, 240, 245 provide a time scope of the validity of the data saved in that cache nodes 220, 225, 230. The registered queries in the list of registered queries 275 up to, and including, the last scanned query 235, 240, 245 are updated and correctly represented by the cache nodes 220, 225, 230.

For the registered queries in the list of registered queries 275 after the last scanned query 235, 240, 245 (i.e., newer registered queries added after a currently selected cache node was last built or refreshed), it is not known whether these registered queries match the currently selected cache node. These registered queries must be checked for a match or scanned next time the currently selected cache node is accessed.

All cache nodes 220, 225, 230 with the same last scanned query 235, 240, 245 are chained together. This chaining list is anchored in the registered query structure of that particular registered query. This chaining list is used to maintain cache validity when a registered query is deleted or de-registered.

Each cache node 220, 225, 230 may point to a list of the cache list elements (CELs) 255, 260, 265. Cache list elements 220, 225, 230 represent registered queries that match a particular cache node. A registered query can match multiple instances of the cache key 211 and therefore can have cache list elements 220, 225, 260 added for a particular registered query to multiple cache nodes. All cache elements that represent the same registered query for different cache nodes are chained together. This chaining list is anchored in the registered query structure of that particular registered query. This chaining list is used to maintain cache validity when a registered query is deleted or de-registered.

A placeholder cache node (PNODE) 250 does not have a cache key 211 and is not included in the binary tree 215 of the cache nodes 220, 225, 230. The placeholder cache node 250 is never searched for and is accessed directly from the cache header 205.

A purpose of the placeholder cache node 250 is to serve as an anchor point for cache list elements 270 for the registered queries that are not compatible with the cache key 211. Unlike normal cache nodes 220, 225, 230, which are updated or refreshed only when the cache node is selected for the input record, placeholder cache node 250 is updated every time the selection query cache 200 is accessed. For that reason, the last scanned query pointer is not used in the placeholder cache node 250.

FIG. 2 illustrates the data structures of the selection query cache 200 and links between them, except for the pointers from registered queries 280, 285, 290, 295 to the list of cache nodes 255, 260, 265 that use certain registered queries 280, 285, 290, 295 as their last scanned query 235, 240, 245, which are not shown for readability.

Figure 3:
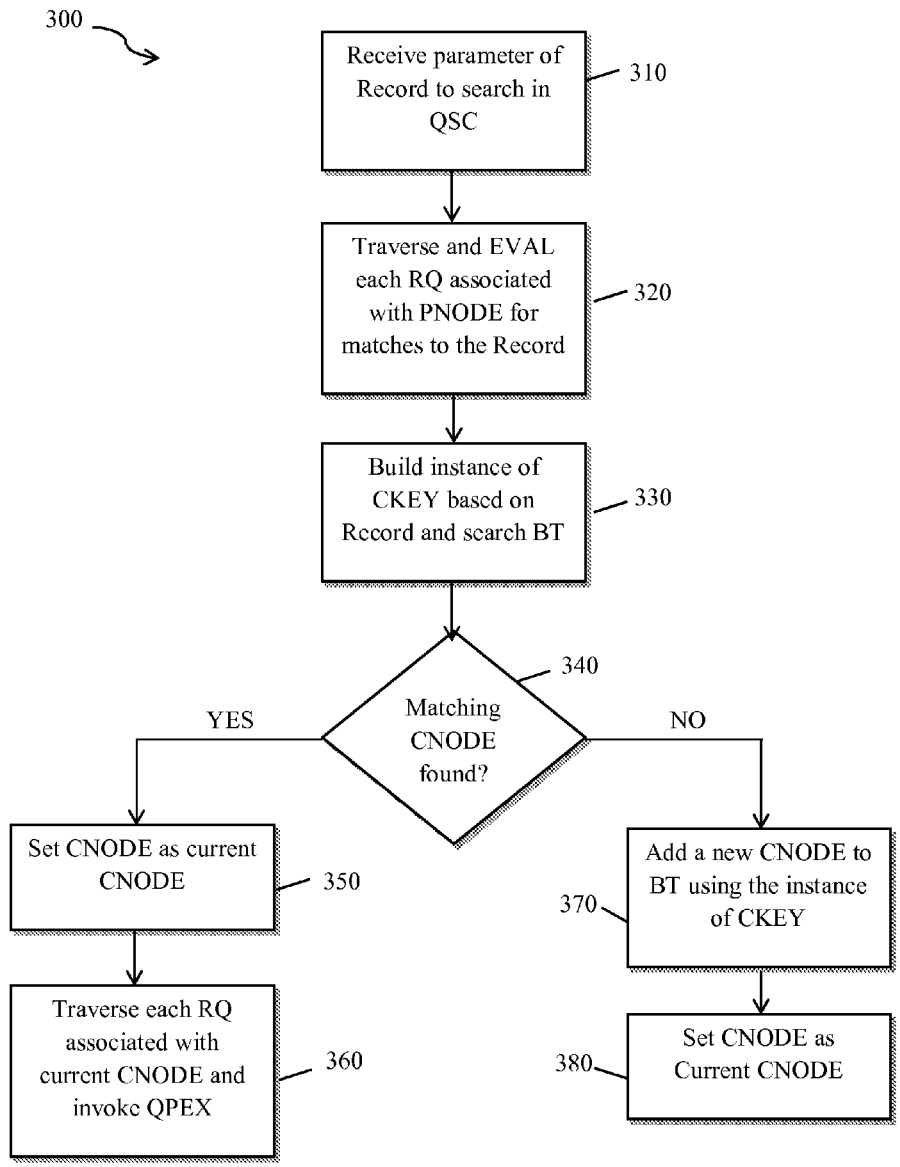
FIG. 3 depicts a flow diagram of a process for finding all registered queries that match a given record in the query selection cache according to an embodiment.

FIG. 3 illustrates a flow diagram of an exemplary method for finding all registered queries that match a given record in the query selection cache and invoking a query processing exit for each matching registered query. Referring to FIG. 3, the find all registered queries method 300 uses one parameter, for example a pointer or reference to the given record, to commence the selection of all matching registered queries as shown in block 310.

In block 320, the method traverses a list of cache elements attached to the placeholder cache node. The registered queries represented in this list of cache elements are not compatible with the cache key, so every registered query in this list must be fully evaluated before a decision can be made whether it matches the given record.

Accordingly, for every cache list element on the list, an expression evaluator is invoked to test whether the logical expression in the registered query matches the record. If the expression evaluator returns true, the registered query is passed to a query processing exit where a processing associated with the registered query is invoked. Examples of processing associated with a registered query include, but are not limited to, sending a notification message or waking an application to perform a specialized process. Otherwise, if the expression evaluator returns false, this registered query is skipped.

In block 330, an instance of the cache key is built based on data fields from the record. The specification of the cache key is in the cache attributes table. The binary tree of cache nodes is then searched using the instance of a key built based on data fields from the record.

If a matching cache node is found in the search of the binary tree in decision block 340, the matching cache node is set as the current cache node in block 350. The found cache node includes a list of cache elements representing registered queries that have two qualities: (1) their logical expressions are known to be compatible with the cache key, and (2) their logical expressions are known to match the instance of the cache key in the current node.

Accordingly, in block 360, the list of cache elements attached to the found cache node is traversed and each represented registered query on the list is passed to a query processing exit where a processing associated with the registered query is invoked.

If a matching cache node is not found in the search of the binary tree in decision block 340, a new cache node is built using the key constructed from block 330. The new cache node is added to the binary tree using known tree-management algorithm in block 370 and the new cache node is set as the current cache node in block 380.

Figure 4:
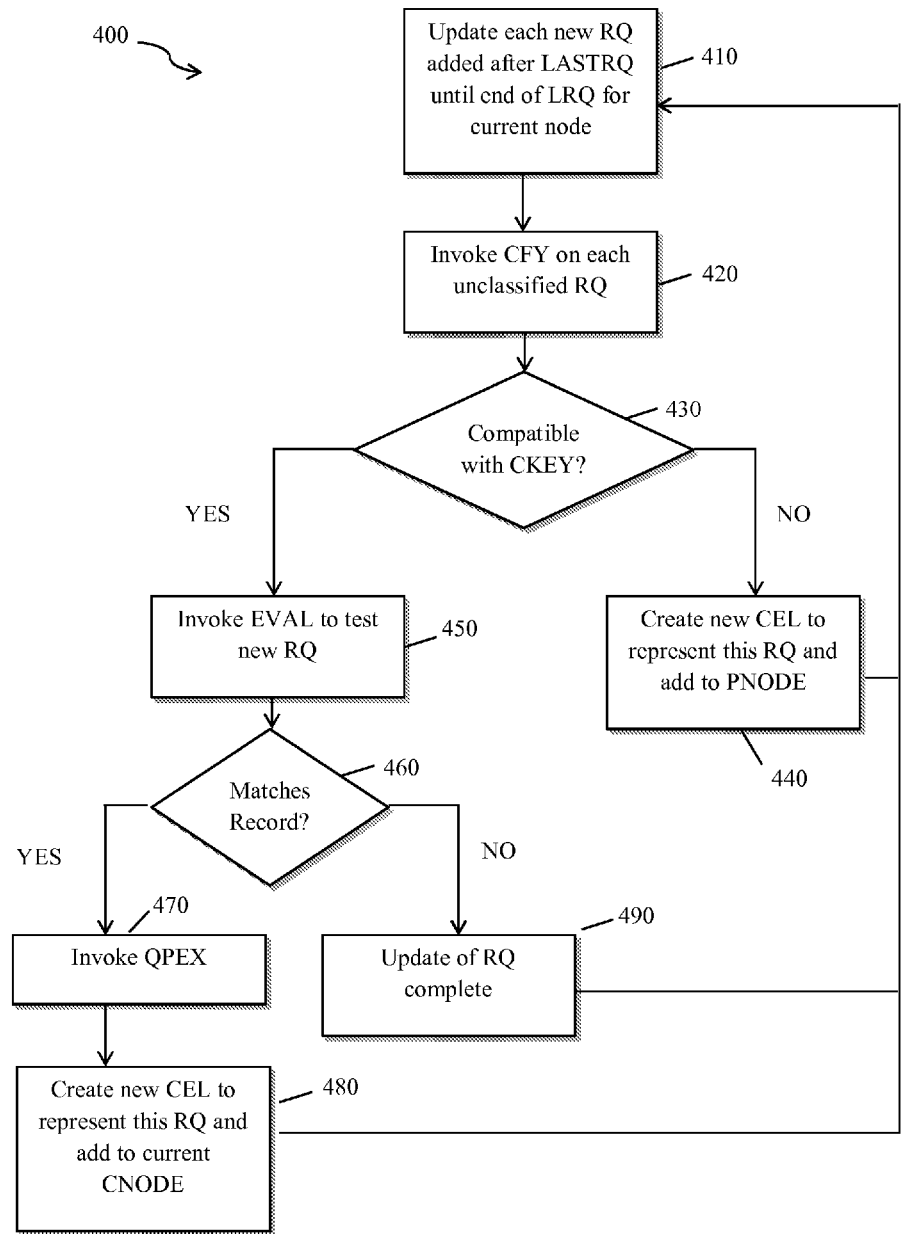
FIG. 4 depicts a flow diagram of a self-updating process for classifying and evaluating newly added queries according to an embodiment.

After finding all registered queries that match a given record in the query selection cache as described in FIG. 3, the query selection cache is updated to process newly registered queries according to an embodiment of the disclosure. FIG. 4 illustrates an embodiment of a method for updating the query selection cache by classifying the compatibility of newly registered queries with the cache key and evaluating whether compatible newly registered queries match the record.

The logical expression of a registered query is compatible with the cache key if all data fields used in the logical expression are included in the cache key. The significance of the concept of compatibility in embodiments of the invention is that logical expressions which are compatible with the cache key can be evaluated using only the values of the fields included in the cache key and access to other data fields in the record is not required. Therefore, a registered query with a compatible logical expression can be evaluated only once and the result of the evaluation can be associated with a given instance of the cache key and saved in the cache for later re-use.

If a logical expression is not compatible with the cache key, evaluation of such expression requires access to all data fields in the record. Thus, the registered query can not be associated with any instance of the cache key and must be re-evaluated every time registered query selection is performed.

The performance benefit of the query selection cache depends on the selection of a cache key which is compatible with most logical expressions the in registered queries. If most of the selection expressions are not compatible with the cache key, then the respective registered queries will be re-evaluated for every query selection request. However, if most logical expressions are compatible, then most registered queries will be spread across multiple instances of the cache key. Then a query selection request will need to process just a small subset of the registered queries. Moreover, since the outcome of the expression evaluation is already known, additional performance benefits can be realized by avoiding repeated expression evaluations for these registered queries.

The compatibility of logical expression and the cache key is determined by a process called cache classification (CFY). Cache classification is a compares a logical expression and cache key and makes a decision whether expression is compatible (true) or not (false).

Referring to FIG. 4, the self-updating method 400 of an embodiment of the invention retrieves a reference to the last scanned query from the current cache node and positions a pointer to the next registered after that in the list of registered queries. If the last scanned query was not previously set, a pointer is positioned to the first registered query in the list of registered queries.

This registered query represents the point where the update will start and each registered query from this point in the list of registered queries will be updated for the current cache node as shown in block 410.

Each registered query added after the last scanned query is checked to determine if a query classification had already been performed for the selected registered query.

If classification had already been performed for the selected registered query and the logical expression in that registered query was found to be incompatible with the cache key, updating for that registered query is complete and processing continues to the next registered query in the list of registered queries.

If classification had already been performed for the selected registered query and the logical expression in that registered query was found to be compatible with the cache key, the expression evaluator is invoked to test whether the selected registered query matches the record.

If the expression evaluator returns true, each selected registered query is passed to a query processing exit where a processing associated with the registered query is invoked. Moreover, because the selected registered query matches the current cache node the selected registered query must be saved in the query selection cache by creating a new cache list element to represent the selected registered query. Accordingly, the selected registered query is added to the cache element list in the current cache node and the cache list element is added to the list in the registered query of cache elements that represent this registered query in the cache. The update for the selected registered query is complete the update method continues to the next registered query in the list.

If the expression evaluator returns false, the selected registered query does not match the current cache node. Updating for the selected registered query is complete and processing continues to the next registered query in the list of registered queries.

Otherwise, if classification has not yet been done for the selected registered query, query classification is invoked and the results of the classification are saved in the registered query as shown in block 420. The compatibility of the selected registered query and the cache key is determined by a comparison of the logical expression of the registered query and the cache key.

In decision block 430, if the logical expression of the newly classified register query is not compatible with the cache key, a new cache list element is created to represent this registered query and is added to the cache element list in the placeholder node as shown in block 440. This cache list element is also added to the list in the registered query of cache elements that represent this registered query in the cache. Updating for the selected registered query is complete and processing continues to the next registered query in the list of registered queries.

If the logical expression of the newly classified register query is compatible with the cache key in decision block 430, the expression evaluator is invoked to test whether the selected registered query matches the record in block 450.

If the selected registered query matches the record in decision block 460, the selected registered query is passed to a query processing exit where a processing associated with the registered query is invoked in block 470.

The selected registered query is saved in the query selection cache by creating a new cache list element to represent the selected registered query as shown in block. As shown in block 480, the selected registered query is added to the cache element list in the current cache node and the cache list element is added to the list in the registered query of cache elements that represent this registered query in the cache. The update for the selected registered query is complete the update method continues to the next registered query in the list.

If the selected registered query does not match the record in decision block 460, the update for the selected registered query is complete the update method continues to the next registered query in the list as shown in block 490.

After reaching the end of the list of registered queries, the reference to the last scanned query in the current cache node is updated to point to the last registered query in the list of registered queries and the current cache node is added to the list of cache nodes in the last registered query in the list of registered queries.

The current cache node now represents up-to-date results of the latest query selection request and will be used by the find all registered queries method to optimize future query selection requests.

Embodiments of the invention maintain query selection cache validity as queries are added (registered) and removed (deregistered).

In an embodiment, a query is registered to the list of registered queries by allocating a new registered query structure and adding the registered query to the end of the list of registered queries, thereby making it the newest registered query known to the query selection cache. In another embodiment, the process of query classification and populating of the placeholder node can be done at the time the query is registered to the list of registered queries. The register query embodiment of the invention may also have an additional parameter to associate a query processing exit with the registered query. In this way, it is possible for each registered query to have its own unique query processing exit.

Figure 5:
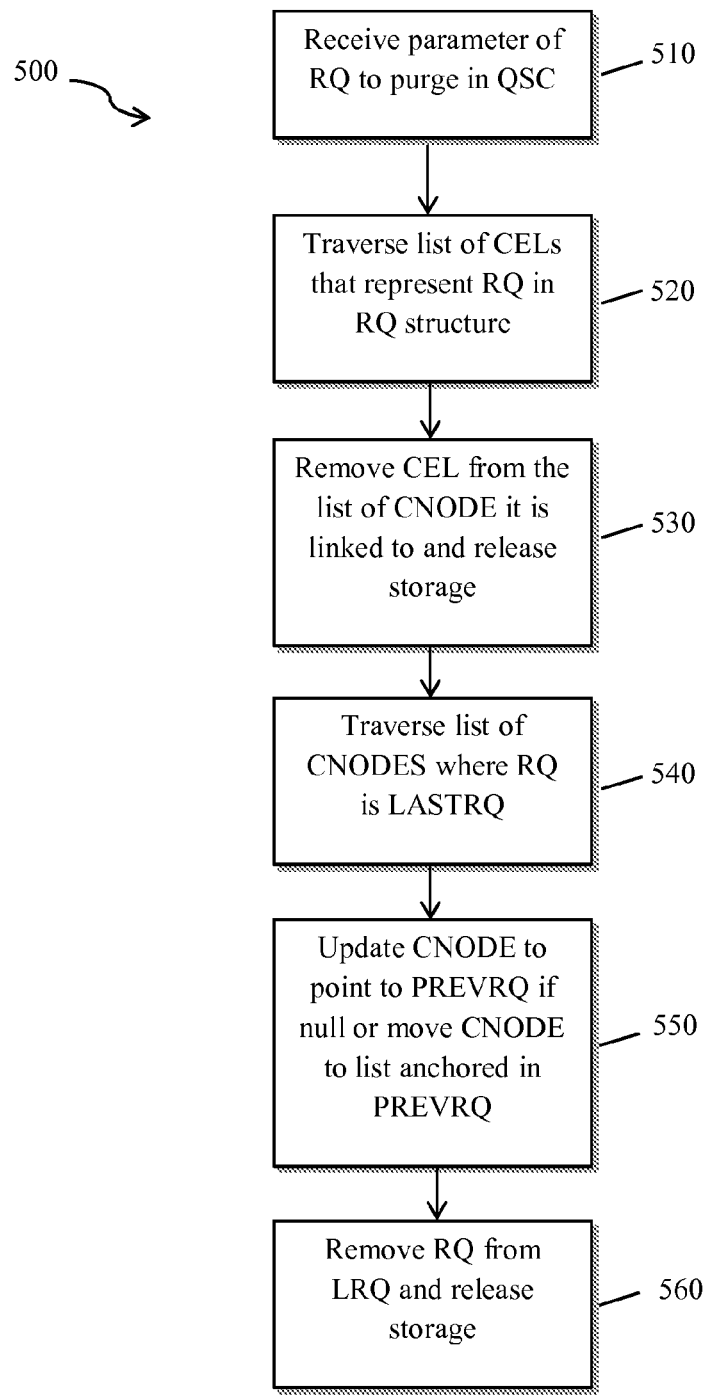
FIG. 5 depicts a flow diagram of a purging process for deregistering a query from the query selection cache according to an embodiment.

Referring to FIG. 5, an exemplary method for purging a given registered query from all structures in the cache is described. After invocation of the purge registered query method 500, the selected registered query is no longer known to the query selection cache.

In block 510, a pointer to the registered query RQ to be purged is received by the purge registered query method 500. The list of cache list elements representing the registered query to be purged in the cache is traversed in block 520. This list is anchored in the selected registered query's structure. In block 530, each cache list element is removed from the list of cache elements for the cache node it is linked to and the storage used by the cache element is released.

A previous registered query (PREVRQ), which precedes the given registered query in the list of registered queries, is located. Note that the previous registered query is older than the registered query to be purged. If there is no previous registered query, then the previous registered query reference is null.

The list of cache nodes that use the registered query to be purged as their last scanned query is traversed as shown in block 540. This list is anchored in the registered query structure. In block 550, for each cache node in the list, their respective pointers are updated to point to the previous registered query or null.

If previous registered query is not null, the cache node is moved from the list anchored in the registered query to be purged to the list anchored in the previous registered query. The registered query is then removed from the list of registered queries and the storage used by the purged registered query is released in block 560.

In an embodiment, a cache constructor creates an empty cache ready for subsequent use. The cache constructor returns a pointer or reference to the cache header representing an instance of the cache. The cache constructor creates a cache header structure, creates an initially empty list of registered queries, links the cache header structure to the cache attributes table, creates an empty binary tree of cache nodes, and creates a placeholder cache node with an empty list of cache elements.

In another embodiment, the cache constructor can perform preprocessing of the cache key specified in the cache attributes table. The purpose of this preprocessing is to optimize performance of cache classification.

In another embodiment, a cache destructor is provided for destroying a given instance of the cache. The cache destructor has no parameters and destroys all data structures built to support the cache and releases all storage allocated for these structures. To access the cache nodes stored in the binary tree, the destructor may use any suitable known tree traversal algorithm. For example, the cache nodes created in embodiments of the present invention could be linked into a separate list of the cache nodes in a simple arrival order to be used by the cache destructor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system comprising:
a processor, a system memory, and a bus that couples various system components including the system memory to the processor, the system configured to perform a method comprising:
constructing a cache for storing results of previously evaluated queries in a binary tree based on a cache key;
searching, with a processing device, the cache for a node representing a set of previously evaluated queries that match a given record using an instance of the cache key;
performing processing associated with the set of previously evaluated queries in response to finding a representative node that matches the instance of the cache key;
creating a new node using the instance of the cache key in response to finding no representative node; and
updating the cache by classifying the compatibility of newly registered queries with the cache key and evaluating whether compatible newly registered queries match the record.

2. The computer system of claim 1, wherein a newly registered query is added to the end of a chronological list of registered queries stored in the cache.

3. The computer system of claim 1, wherein each node in the binary tree has a validity pointer to a last registered query that was previously evaluated for that particular node.

4. The computer system of claim 1, further comprising a placeholder cache node representative of a set of registered queries that are not compatible with the cache key and are evaluated each time the cache is accessed.

5. The computer system of claim 4, wherein based on results of classification, the method further comprises:
   invoking an expression evaluator to test whether the newly registered query matches the record in response to determining that the newly registered query is compatible with the cache key;
   adding the newly registered query to the set of registered queries represented by the placeholder cache node in response to determining that the newly registered query is not compatible with the cache key;
   performing processing associated with the newly registered query and adding the registered query to a subset of previously evaluated queries in the binary tree in response to the determination by the expression evaluator that the newly registered query matches the record; and
   completing processing of the newly registered query in response to the determination by the expression evaluator that the newly registered query does not match the record.

6. The computer system of claim 1, further comprising a purge registered query operation for removing a selected registered query from all structures in the cache, the purge registered query operation comprising:
   removing the selected registered query from each representative node in the binary tree and releasing storage therein;
   traversing a list of nodes having a validity pointer to the selected registered query and updating each validity pointer to point to a registered query preceding the selected registered query on the chronological list of registered queries; and
   removing the selected registered query from the chronological list of registered queries and releasing the storage used by the selected registered query.

7. A computer program product comprising:
   a computer readable storage medium having computer readable program code stored thereon that, when executed, performs a method, the method comprising:
   constructing a cache for storing results of previously evaluated queries in a binary tree based on a cache key;
   searching, with a processing device, the cache for a node representing a set of previously evaluated queries that match a given record using an instance of the cache key;
   performing processing associated with the set of previously evaluated queries in response to finding a representative node that matches the instance of the cache key;
   creating a new node using the instance of the cache key in response to finding no representative node; and
   updating the cache by classifying the compatibility of newly registered queries with the cache key and evaluating whether compatible newly registered queries match the record.

8. The computer program product of claim 7, wherein a newly registered query is added to the end of a chronological list of registered queries stored in the cache.

9. The computer program product of claim 7, wherein each node in the binary tree has a validity pointer to a last registered query that was previously evaluated for that particular node.

10. The computer program product of claim 7, further comprising a placeholder cache node representative of a set of registered queries that are not compatible with the cache key and are evaluated each time the cache is accessed.

11. The computer program product of claim 10, wherein based on results of classification, the method further comprises:
    invoking an expression evaluator to test whether the newly registered query matches the record in response to determining that the newly registered query is compatible with the cache key; and
    adding the newly registered query to the set of registered queries represented by the placeholder cache node in response to determining that the newly registered query is not compatible with the cache key.

12. The computer program product of claim 11, wherein evaluation of newly registered queries further comprises:
    performing processing associated with the newly registered query and adding the registered query to a subset of previously evaluated queries in the binary tree in response to the determination by the expression evaluator that the newly registered query matches the record; and
    completing processing of the newly registered query in response to the determination by the expression evaluator that the newly registered query does not match the record.

13. The computer program product of claim 7, further comprising a purge registered query operation for removing a selected registered query from all structures in the cache, the purge registered query operation comprising:
    removing the selected registered query from each representative node in the binary tree and releasing storage therein;
    traversing a list of nodes having a validity pointer to the selected registered query and updating each validity pointer to point to a registered query preceding the selected registered query on the chronological list of registered queries; and
    removing the selected registered query from the chronological list of registered queries and releasing the storage used by the selected registered query.

14. A computer-implemented method comprising:
    constructing a cache for storing results of previously evaluated queries in a binary tree based on a cache key;
    searching, with a processing device, the cache for a node representing a set of previously evaluated queries that match a given record using an instance of the cache key;
    performing processing associated with the set of previously evaluated queries in response to finding a representative node that matches the instance of the cache key;
    creating a new node using the instance of the cache key in response to finding no representative node; and
    updating the cache by classifying the compatibility of newly registered queries with the cache key and evaluating whether compatible newly registered queries match the record.

15. The computer-implemented method of claim 14, wherein a newly registered query is added to the end of a chronological list of registered queries stored in the cache.

16. The computer-implemented method of claim 14, wherein each node in the binary tree has a validity pointer to a last registered query that was previously evaluated for that particular node.

17. The computer-implemented method of claim 14, further comprising a placeholder cache node representative of a set of registered queries that are not compatible with the cache key and are evaluated each time the cache is accessed.

18. The computer-implemented method of claim 17, wherein based on results of classification, the method further comprises:

invoking an expression evaluator to test whether the newly registered query matches the record in response to determining that the newly registered query is compatible with the cache key; and adding the newly registered query to the set of registered queries represented by the placeholder cache node in response to determining that the newly registered query is not compatible with the cache key.

19. The computer-implemented method of claim 18, wherein evaluation of newly registered queries further comprises:

performing processing associated with the newly registered query and adding the registered query to a subset of previously evaluated queries in the binary tree in response to the determination by the expression evaluator that the newly registered query matches the record; and completing processing of the newly registered query in response to the determination by the expression evaluator that the newly registered query does not match the record.

20. The computer-implemented method of claim 14, further comprising a purge registered query operation for removing a selected registered query from all structures in the cache, the purge registered query operation comprising:

removing the selected registered query from each representative node in the binary tree and releasing storage therein;

traversing a list of nodes having a validity pointer to the selected registered query and updating each validity pointer to point to a registered query preceding the selected registered query on the chronological list of registered queries; and removing the selected registered query from the chronological list of registered queries and releasing the storage used by the selected registered query.

* * * * *